(12) United States Patent
Sarwar et al.

(10) Patent No.: US 11,349,987 B2
(45) Date of Patent: May 31, 2022

(54) CALL AUTHENTICATION SERVICE SYSTEMS AND METHODS

(71) Applicant: SecureLogix Corporation, San Antonio, TX (US)

(72) Inventors: Golam Babil Sarwar, Blacktown (AU); Mark Collier, Austin, TX (US)

(73) Assignee: SecureLogix Corporation, San Antonio, TX (US)

( * ) Notice: Subject to any disclaimer, the term of this patent is extended or adjusted under 35 U.S.C. 154(b) by 0 days.

(21) Appl. No.: 17/252,406

(22) PCT Filed: Jun. 21, 2019

(86) PCT No.: PCT/US2019/038446
§ 371 (c)(1),
(2) Date: Dec. 15, 2020

(87) PCT Pub. No.: WO2019/246506
PCT Pub. Date: Dec. 26, 2019

(65) Prior Publication Data
US 2021/0195022 A1 Jun. 24, 2021

Related U.S. Application Data

(60) Provisional application No. 62/688,144, filed on Jun. 21, 2018.

(51) Int. Cl.
*H04M 3/436* (2006.01)
*H04L 29/06* (2006.01)
(Continued)

(52) U.S. Cl.
CPC ............ *H04M 3/436* (2013.01); *G06F 21/32* (2013.01); *G06F 21/44* (2013.01); *H04L 63/205* (2013.01);
(Continued)

(58) Field of Classification Search
CPC ......... G06F 21/32; G06F 21/44; H04L 12/56; H04L 29/06; H04L 29/06027; H04L 29/08576; H04L 63/205; H04M 3/436; H04M 2203/6027; H04M 2203/6054; H04W 12/06
(Continued)

(56) References Cited

U.S. PATENT DOCUMENTS

6,226,372 B1 5/2001 Beebe et al.
6,249,575 B1 6/2001 Heilmann et al.
(Continued)

*Primary Examiner* — Harry S Hong
(74) *Attorney, Agent, or Firm* — William H. Quirk; Alexander J. Antonio; Rosenthal Pauerstein Sandoloski Agather, LLP (57) ABSTRACT

A system for authenticating the calling device used to place a call to an enterprise call center. The system uses a premise component, a cloud-based Call Authentication Service (CAS), and orchestration between these two components. The premise component includes a number of sub-components including servers and probes. The CAS includes a Decision Engine that utilizes a number and variety of authentication plugins. The disclosed system may be used independently or as part of a multi-factor authentication strategy with other techniques such as reduced Knowledge-Based Authentication or voice biometrics.

12 Claims, 3 Drawing Sheets

(51) Int. Cl.
   *G06F 21/44*   (2013.01)
   *G06F 21/32*   (2013.01)
   *H04L 9/40*    (2022.01)
   *H04W 12/06*   (2021.01)
(52) U.S. Cl.
   CPC ............ *H04M 2203/6027* (2013.01); *H04M 2203/6054* (2013.01); *H04W 12/06* (2013.01)
(58) Field of Classification Search
   USPC ..... 370/242, 395.2, 401; 379/210.02, 210.03
   See application file for complete search history.

(56)            References Cited

U.S. PATENT DOCUMENTS

| | | | |
|---|---|---|---|
| 6,320,948 | B1 | 11/2001 | Heilmann et al. |
| 6,687,353 | B1 | 2/2004 | Brysch et al. |
| 6,700,964 | B2 | 3/2004 | Schmid et al. |
| 6,718,024 | B1 | 4/2004 | Heilmann et al. |
| 6,735,291 | B1 | 5/2004 | Schmid et al. |
| 6,760,420 | B2 | 7/2004 | Heilmann et al. |
| 6,760,421 | B2 | 7/2004 | Heilmann et al. |
| 6,879,671 | B2 | 4/2005 | Schmid et al. |
| 7,133,511 | B2 | 11/2006 | Buntin et al. |
| 7,231,027 | B2 | 6/2007 | Schmid et al. |
| 7,440,558 | B2 | 10/2008 | Heilmann et al. |
| 8,150,013 | B2 | 4/2012 | Buntin et al. |
| 8,238,532 | B1 | 8/2012 | Cox et al. |
| 9,001,985 | B2 | 4/2015 | Cox et al. |
| 9,762,728 | B1 | 9/2017 | Cox et al. |
| 9,871,913 | B1 | 1/2018 | Saitawdekar et al. |
| 10,547,739 | B2 | 1/2020 | Cody et al. |
| 10,623,403 | B1* | 4/2020 | Gupta ................. H04M 3/5166 |
| 10,665,244 | B1* | 5/2020 | Gupta ................. H04W 12/06 |
| 10,693,840 | B2 | 6/2020 | Peterson et al. |
| 2002/0106065 | A1* | 8/2002 | Joyce ................. G06Q 20/3224 379/114.02 |
| 2003/0112951 | A1* | 6/2003 | Brown ................. H04M 3/436 379/210.02 |
| 2003/0156700 | A1* | 8/2003 | Brown ................. H04M 15/06 379/210.02 |
| 2004/0228336 | A1* | 11/2004 | Kung ................. H04L 12/1457 370/352 |
| 2006/0291642 | A1* | 12/2006 | Bushey ............... H04M 3/5166 379/212.01 |
| 2007/0019625 | A1* | 1/2007 | Ramachandran ....... H04L 45/04 370/352 |
| 2007/0091907 | A1* | 4/2007 | Seshadri ............... H04L 63/029 370/401 |
| 2007/0094374 | A1* | 4/2007 | Karia ................. H04L 61/2564 709/223 |
| 2007/0264989 | A1* | 11/2007 | Palakkal ............. H04L 65/1069 455/416 |
| 2012/0177195 | A1* | 7/2012 | Elliott ................ H04L 65/605 379/240 |
| 2015/0094026 | A1* | 4/2015 | Martin ................ H04L 63/08 455/411 |
| 2017/0076076 | A1* | 3/2017 | Materna ............. G06Q 20/40145 |
| 2018/0240120 | A1* | 8/2018 | Nicoletti .......... G06Q 20/40145 |

\* cited by examiner

CALL AUTHENTICATION SERVICE SYSTEMS AND METHODS

CLAIM OF PRIORITY TO PRIOR APPLICATION

This application claims the benefit of the filing date of U.S. Provisional Application, Ser. No. 62/688,144, filed on Jun. 21, 2018. The entire disclosure, including the claims and drawings, of U.S. Provisional Application, Ser. No. 62/688,144, is incorporated by reference into this application as though now set forth in its entirety.

BACKGROUND OF THE INVENTION

1. Field of the Invention

The present invention primarily relates to systems and methods for identifying and authenticating the calling device used to place a call, particularly calls to contact centers for financial transactions.

2. Description of Related Art

Call authentication is needed in all enterprises, but specifically those that deal with consumers who call into contact centers for financial (banking, insurance, and others) transactions. More specifically, these are customers who have no prior relationship with the agent who answers the call (as opposed to an individual calling their stock broker).

Traditionally, there are four categories of authentication methods, each carrying its own properties, exploits, and problems: knowledge-based (for example, what the user knows like a PIN number); token-based (for example, what the user has, such as a magnetic card); a combination knowledge and token based (for example, like an ATM requiring a card and a PIN); and biometric (for example, something unique to the user, like a fingerprint). Another approach is use of voice biometrics that authenticates the caller.

The current state of the art for authentication is use of Knowledge Based Authentication (KBA), which authenticates consumers based on information they know. KBA is time-consuming (wastes agent time), undesirable for the customer, and not effective in fighting fraud.

There are also a number of new approaches, primarily based on data or capabilities offered by service providers, that authenticate the calling number/Automatic Number Identification (ANI) or calling device (mobile phone, landline, or other).

Determining whether the calling number is authentic or spoofed is essential to detecting more sophisticated attacks, which are increasingly common in voice networks. Authentic calls can also receive faster treatment in financial organizations, suspicious calls can receive further analysis, and malicious calls can be dropped or rerouted to a honeypot, fraud agent, or other resource. A brief review of malicious call attacks, all of which are made more difficult to address due to spoofing and lack of authentication, include:

Account Takeover (ATO)—A form of impersonation scam designed for financial fraud, where the attacker steals funds from a victim's account.

Social Engineering—Sinister calls designed to gather information such as intelligence, passwords, or personal data. These are typically targeted at specific individuals. These calls are often undetected and may be coordinated with email and other phishing.

Telephony Denial of Service (TDoS)—A flood of inbound calls, typically to a public-facing contact center or other critical voice system, that prevents legitimate customers from obtaining service. TDoS can target the inbound trunks, equipment, or agents.

Robocalls—Calls designed to sell a service, gather information, or trick the victim into calling a number back. Some robocalls are more sinister and are designed to impersonate organizations such as the Internal Revenue Service (IRS) and trick the victim into dispensing funds.

Harassing calls—Targeted calls designed to threaten or annoy the victim. Examples include threatening or annoying calls directed at senior officials, SWATting calls to 911, bomb threats, etc.

Call pumping—Different types of inbound calls designed to cost the organization money on artificially generated calls to 1-800 services.

Call authentication is a long-standing problem, and a lot of work has been done in this area to date. However, no solution is perfect, and there is still a need for new technology to be developed to help enterprises authenticate callers. For these reasons, there is a substantial need for improvement in the systems currently used for authentication of users without increasing the complexity and cost to the users. In order to balance these interests, there is a long-felt need in the art for authentication systems that are simpler and less expensive to implement and use while providing improved authentication.

SUMMARY OF THE INVENTION

To this end, the present invention provides a novel approach for using an optional customer-premise platform, a cloud-based authentication service, and orchestration between the two, to provide more cost-effective and flexible authentication, which can be used on its own or as part of a Multi-Factor Authentication (MFA) strategy with other techniques such as reduced KBA or voice biometrics. This call authentication solution includes a premise component and a Call Authentication Service (CAS).

The premise component includes a lightweight, stable, and highly configurable Customer-Premise Equipment (CPE) solution. This component is highly desirable for orchestration in the use of the cloud service described below. This component provides access to raw call signaling and media data, access to customer data such as ANI lists that may not be practical to move to the cloud, access to other customer-specific data sources, ability to query the cloud service based on business unit, risk, and other values, and finally, to implement call control or otherwise transmit the authentication result to an Interactive Voice Response (IVR) system or agent.

The CAS component is a cloud-resident service that is queried in real time for each call of interest, usually for all calls, to return a score for each call, from 0 (spoofed/malicious) to 100 (clearly authentic). CAS provides one interface to query to simplify integration through customer security systems. CAS implements a wide variety of distinct techniques (called plugins) to authenticate the call. CAS orchestrates the use of different plugins, as per customer requirements, to provide the cheapest, fastest, most cost-effective, and/or best authentication score. CAS is not locked to a particular set of proprietary techniques; it uses a combination of proprietary, third-party, and standards-based approaches and selects them based on customer requirements. Some authentication techniques involve a per-call charge, so it is wise to use these appropriately. Being in the cloud, CAS can also quickly integrate new authentication plugins and provide the value to the customer much faster than possible by upgrading a premise system.

The disclosed system and methods offer a number of advantages, including:

- Wide coverage for authentication of calling devices, including mobile, landline, business/PBX, and Voice over IP (VoIP);
- High success rates for these device types. This is achieved through attempted use of multiple approaches for a given device type;
- Will insulate the customer from changes to CAS, which can be updated with new capability without requiring changes on the customer premise;
- CAS will provide a single network interface to simplify access through firewalls and other security products;
- Will take advantage of new authentication and spoofing techniques that come to market, to include standards or capabilities provided by service providers and other vendors;
- Will take advantage of multiple authentication and spoofing detection techniques and use those that are the most suitable for a given call, line of business, use case, risk, etc.;
- Will provide a score at the start of a call that can be used for call treatment, such as termination or redirection. This is also valuable in an IVR for consumer containment;
- Will provide additional scores at other points in the call flow, such as after the call is connected or when the customer "opts-out" of the IVR to speak to an agent; and
- Will be less expensive than other current solutions. It is estimated that the cost and quality of authentication will improve over time, as more techniques become available.

An example of how CAS is transparently improved is that sometime in the near future, Secure Telephony Revisited (STIR)/Signature-Based Handling of Asserted Information using ToKENs (SHAKEN) will be available. STIR/SHAKEN is an industry standard for authenticating the calling number. The Federal Communications Commission (FCC) is aggressively pushing the service providers and industry to adopt this standard. Since the information needed to support STIR/SHAKEN will already be passed to CAS, this data can be used to improve the authentication process. This is much more efficient than requiring the customer to change premise equipment and systems to use this new data. This may result in greater authentication coverage or more likely, will reduce the cost of authentication, because the calls authenticated with STIR/SHAKEN will be less expensive than other proprietary methods.

Many other objects, features, advantages, benefits, improvements and non-obvious unique aspects of the disclosed embodiments, as well as the prior problems, obstacles, limitations and challenges that are addressed, will be evident to the reader who is skilled in the art, particularly when this application is considered in light of the prior art. It is intended that such objects, features, advantages, benefits, improvements and non-obvious unique aspects are within the scope of the present invention, the scope of which is limited only by the claims of this and any related patent applications and any amendments thereto.

To the accomplishment of all the above, it should be recognized that this invention may be embodied in the form illustrated in the accompanying drawings, attention being called to the fact, however, that the drawings are illustrative only, and that changes may be made in the specifics illustrated or described.

BRIEF DESCRIPTION OF THE DRAWINGS

For a more complete understanding of the present invention and its preferred embodiments, and the advantages thereof, reference is now made to the following descriptions taken in conjunction with the accompanying drawings, in which.

DETAILED DESCRIPTION OF ILLUSTRATIVE EMBODIMENTS

The following examples are included to demonstrate preferred and alternative embodiments. It should be appreciated by those of ordinary skill in the art that the techniques disclosed in these examples are thought to represent techniques that function well in the practice of various embodiments, and thus can be considered to constitute preferred modes for their practice. However, in light of the present disclosure, those of ordinary skill in the art should appreciate that many changes can be made in the specific embodiments which are disclosed while still obtaining a like or similar result without departing from the spirit and scope of the invention.

For purposes of these descriptions, a few wording simplifications should also be understood as universal, except to the extent otherwise clarified in a particular context either in the specification or in any claims. The use of the term "or" in the specification is used to mean "and/or" unless explicitly indicated to refer to alternatives only, or unless the alternatives are inherently mutually exclusive. When referencing values, the term "about" is used to indicate an approximate value that includes the standard deviation of error for any particular embodiments that are disclosed or that are commonly used for determining such value. "A" or "an" may mean one or more, unless clearly indicated otherwise. Such "one or more" meanings are most especially intended when references are made in conjunction with open-ended words such as "having," "comprising," or "including."

Figure 1:
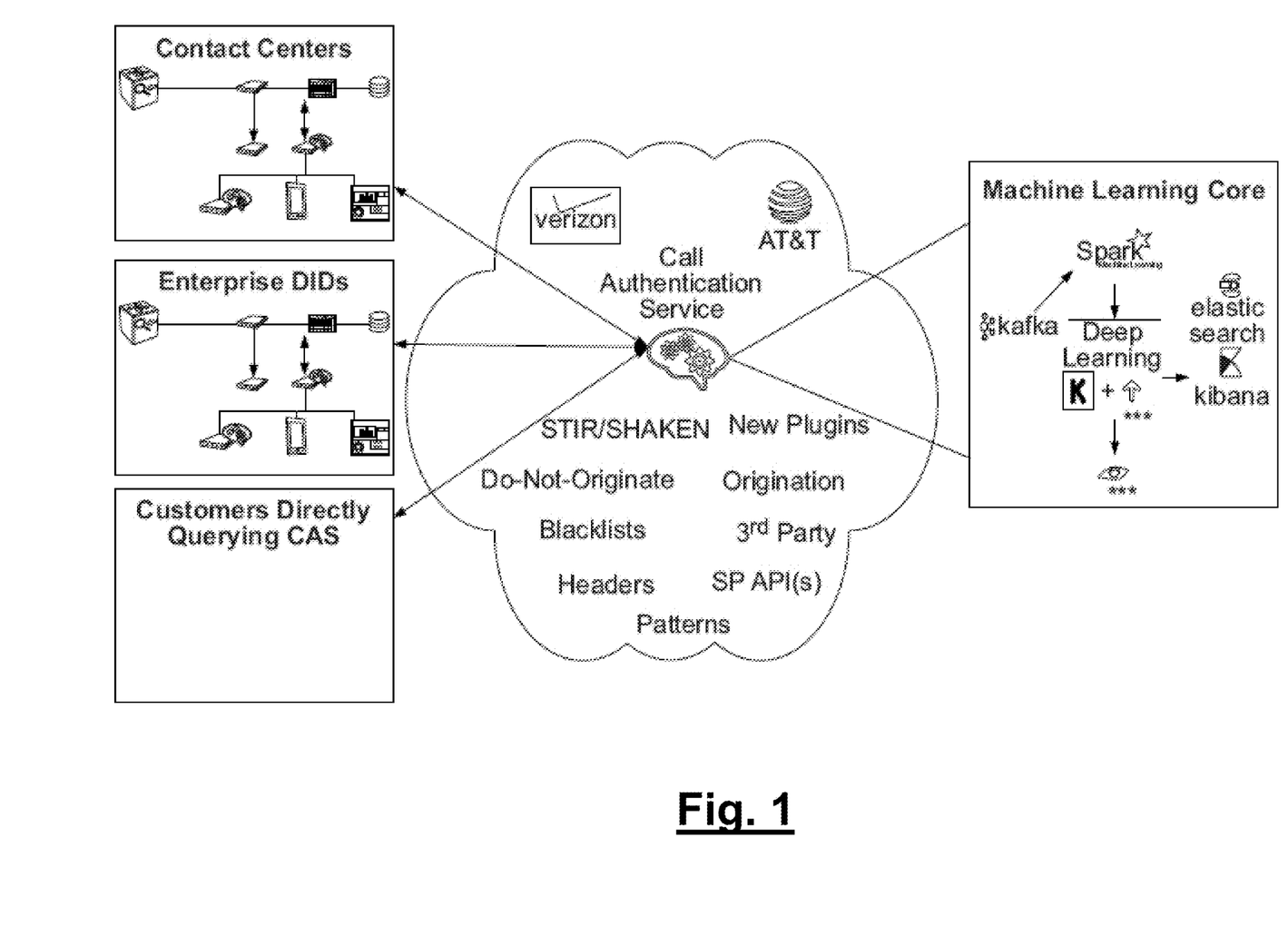
FIG. 1 is a diagrammatic representation illustrating the major components of the disclosed system. This includes the premise component and CAS. Note that CAS is heavily based upon a decision engine and machine learning core that is used to support many of the authentication plugins.

As illustrated in FIG. 1, preferred embodiments of the disclosed system include a premise component shown as "Contact Centers" and "Enterprise DIDs." In the center of the diagram of FIG. 1 is shown the cloud-based Call Authentication Service (CAS) and examples of associated components therein. Associated components may include STIR/SHAKEN, Do-Not-Originate, blacklists, service provider headers, patterns, service provider APIs, other 3$^{rd}$ party APIs, call origination information, and new plugins. On the right in FIG. 1 is shown the Machine Learning Core.

The premise component includes customer-premise based software solutions which can be delivered with hardware if desired. The disclosed system is augmented with the CAS, a cloud-based service that detects authentic and spoofed calls. The system is usually deployed with a Managed Security Service for Voice (MSSV), where analysts run the system and maintain policies; tune blacklists, whitelists, and other lists; analyze data; and respond to attacks and anomalies in real time. This service is useful when responding to sophisticated and evolving attacks.

Premise Component

Figure 2:
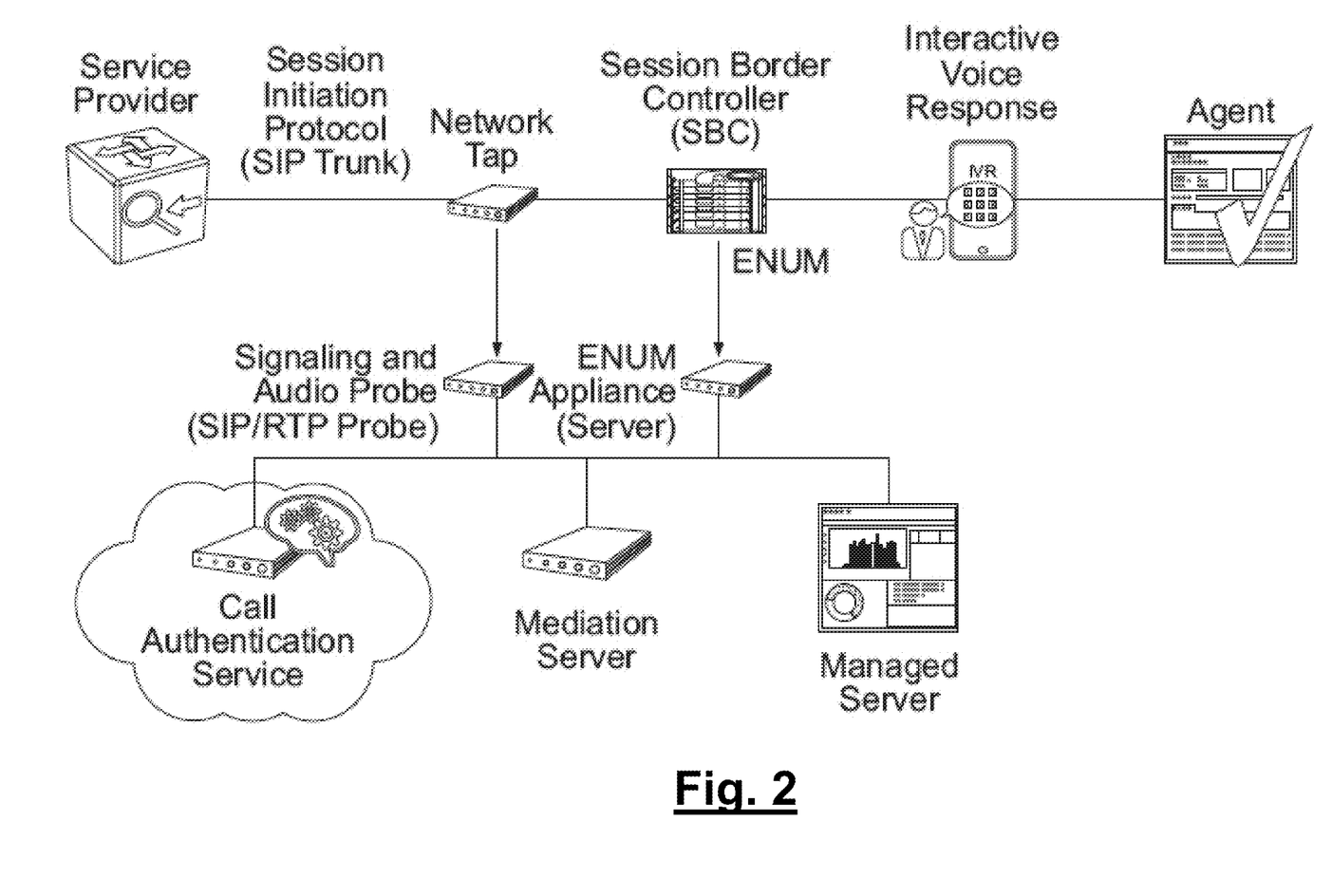
FIG. 2 is a high-level architectural diagram of the premise component.

The premise component monitors all call traffic at the edge of a voice network and provides call firewall and call Intrusion Prevention System (IPS) capabilities that detect and mitigate malicious calls. The solution integrates with common network infrastructure such as a Session Border Controller (SBC) through standard network interfaces. The solution is not inline and cannot impair voice traffic, therefore making it easier to deploy. FIG. 2 shows a high-level architectural diagram of the premise component.

The premise component has several sub-components. The E.164 Number to URI Mapping ("ENUM") appliance or server is the component used to provide call control, including termination or redirection of calls when specified in the customer-defined policy. The ENUM server can also perform very fast, customer-specific local comparisons for blacklist and whitelist processing. Whitelist processing can include orchestration of when CAS is called for some operations, only when the ANI is from a known customer. Many financial contact centers only try to authenticate calls with ANIs from known customers.

The Signaling and Audio Probe (also referred to as the Session Initiation Protocol (SIP)/Real-Time Protocol (RTP) probe) passively monitors all of the SIP data, Dual Tone Multi Frequency (DTMF), and audio traffic. This information is fed to the Mediation Server, which manages all of the components of the solution, for policy processing and storage in the database. The Mediation Server can execute complex business rules, which control the use of CAS, make Application Programming Interfaces (APIs) to customer systems, and provide authentication results to the appropriate system.

The premise component can be used solely for the purpose of enabling call authentication and spoofing detection. Furthermore, this deployment model may only require the SIP/RTP probe, Mediation Server, and CAS. The ENUM server is only required if the solution is used to orchestrate some queries to CAS and control calls based upon results from CAS.

Call Authentication Service (CAS) Architecture

Within CAS, a variety of techniques called authentication "plugins" are used to score the call. The service will return a value between 0 (clearly spoofed) to 100 (clearly authentic). A single HTTPS connection will be used for the service. As one non-limiting example, it is expected that the service may be hosted at Amazon Web Services (AWS) or a similar web hosting service. CAS is typically called to return a value in one of several classes, which can be expanded in the future. These are:

Cheapest result—An authentication score that does not require any queries with a per-call charge. This does not mean the query is free to the customer, just that it does not involve a specific extra query that has a per-call charge.

Fast result—A result that must be returned in a specific amount of time, say 1 second. If a result is not possible, the query returns unknown. This feature is most commonly used with the cheapest result query, when needed for a call control decision at call start.

Best value result—A mid-tier result, which may be suitable for less risky transactions or which may be combined with some other value for reduced KBA or MFA.

Best result—A top tier result that is suitable for risky transactions. It may be usable on its own for authentication.

CAS will be queried to return a result in one or more of these categories for each call. As described in more detail below, the premise component will make these queries according to business rules. For example, all calls will often be queried for a cheapest result. Note that a query for the cheapest result may return a result that can be used for a higher level of authentication. Calls for some business units requiring authentication may be queried in different ways (best value or best result) as defined by risk.

CAS will also offer a "blended" capability, where the cost of authentication is negotiated and how it is performed is opaque to the customer and the premise component. In this case, CAS will use a variety of techniques, while maintaining an authentication score Quality of Service (QoS).

The inherent mechanism that binds the CAS plugins, is called the Decision Engine. Some of the fundamental design principles and goals that motivate CAS's decision-engine and the plugin architecture are as follows:

1. CAS is modular, rapidly scalable, and extensible by design via its pluggable-module architecture.
2. CAS makes the authentication decisions using a combination of various authentication decision plugins.
3. CAS is able to concurrently operate its various decision plugins, making it inherently capable of parallel processing and adding a great deal of operational flexibility.
4. Authentication decision making plugins are located in the cloud back-end, closely satisfying the first design goal.

Decision Engine

Figure 3:
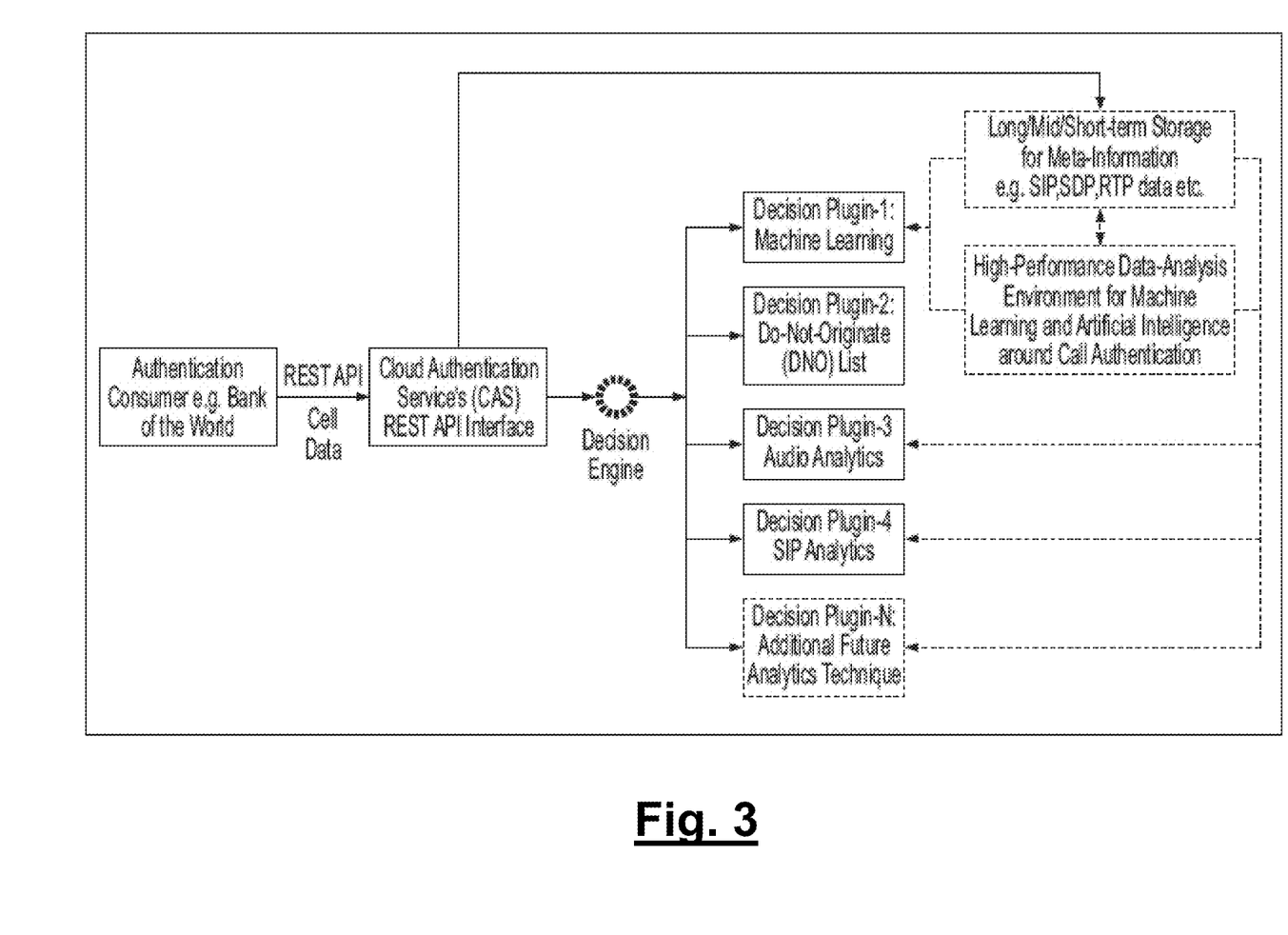
FIG. 3 is a simplified schematic representation of the decision engine and its internal communications within the CAS service.

When call information is submitted by the premise component to CAS over its Representational State Transfer (REST) API interface, CAS is immediately tasked with consulting various decision plugins to come up with a score and return it.

In an example scenario, the premise component could be deployed at a bank with a large contact center, receiving a huge volume of calls from its consumer customers every day. Many of these callers naturally would like to access their accounts managed by the bank. But before the account information could be shared to the user over the phone, the caller (the calling device, or at least the calling number) must be authenticated before receiving the desired level of access to account information.

CAS, together with its Decision Engine, plays the critical role of authenticating the caller to the contact center. Since it is naturally expected by the bank (and the contact center) for the unauthenticated incoming-calls to be serviced as fast as possible, one of the major performance criterion for CAS is "speed," in other words, to minimize the time spent to serve a request. This functional requirement motivates the third design goal discussed above.

Similar to speed, another functional requirement is "cost," i.e., the bank or the contact center would like to minimize its cost, but maximize the number of calls or customers it services per day.

In order to satisfy various combinations of these functional requirements, such as "speed", "cost", and "authentication quality", CAS's Decision Engine first of all opts for a plugin architecture that allows a user to concurrently execute multiple authentication plugins.

To offer further configurable services to the bank customers, CAS introduces a customer controllable parameter called "Quality of Authentication Service" (QAS), and allows breaking down of QAS to customer preferred value (s) while receiving requests for call-authentication over the REST API.

For example, the authentication consumer could request that they need the fastest authentication service available, or an available service under X amount of dollars. Various forms of these quality requirements are discussed more in detail in the section entitled "Call Authentication Service (CAS) Architecture" above. In order to satisfy these functional requirements, the Decision Engine translates the required functional components, business needs, etc., to internally computable and satisfiable variable metrics.

For each decision engine plugin, possible values of these variable metrics are empirically derived given the performance level of the cloud back-end architecture. Once the limits of the variables are determined, these can be translated into an optimization problem as denoted below where x, y, z . . . are QAS metrics.

Minimize: $f(x, y, z \ldots)$

Subject to: $g(x, y, z \ldots) \geq 0$

Solve: $l(x, y, z \ldots) = f(x, y, z \ldots) - \lambda g(x, y, z \ldots)$

Now it is possible to iterate over all possible values of $g(x, y, z \ldots)$ for different decision plugins combinations and cache these values in an in-memory lookup table for very fast access for subsequent use directly from the REST API layer.

When CAS receives an incoming request with a certain combination of constraints from the bank customer, i.e., must be under dollar value X, must not take more than N milliseconds to serve the request, the disclosed system is able to either use a pre-computed lookup table, or instantaneously solve the minimization problem defined above, and find out which combination of the decision plugins to use in order to best serve the request.

CAS Plugins

The initial set of plugins, which makes up the cheapest result, will include several that can be done with no external queries and can also be done very fast. A number of these plugins primarily indicate when a number is spoofed or otherwise malicious. These plugins also help determine when a more expensive authentication query would almost certainly fail and therefore there is no reason to attempt one. For example, if the calling number is clearly spoofed, then there is no need to try to authenticate the call. These plugins may also produce a result which can be used for authentication. Non-limiting examples of some of the various plugins are discussed below.

STIR/SHAKEN—This is a well-known standard being defined by the FCC and service provider industry. STIR/SHAKEN provides a way for the owner or originator of a call to sign the call and verify the messaging at the termination side of the call. STIR/SHAKEN requires the use of SIP and is not available yet in real networks, but is expected to be used sometime in late 2018 or 2019. CAS will make use of STIR/SHAKEN when available and use it as appropriate. Note that STIR/SHAKEN will not produce a binary result. Rather, it will produce several different levels of "attestation". Full attestation may produce a strong authentication result; partial attestation may produce a middle level or none; and "gateway attestation" is likely to produce an unknown. STIR/SHAKEN will also help to detect when a calling number is spoofed.

Source number plugin—While it is not possible to authenticate a call simply based upon this, it is possible to determine whether the calling number is very likely spoofed and therefore, cannot ever be authenticated. CAS will check the construction of the number to determine whether it is formatted properly. It is also possible to use services such as the North American Numbering Plan (NANP), which tracks all of the numbers allocated to North American service providers. If a call arrives that is not in this list, it is almost certainly spoofed. This is a portion of Do-Not-Originate (DNO), a concept promoted by the FCC to eventually be adopted by the service providers. This concept intends to prevent calls originating with invalid or unallocated numbers from being made. The solution will implement this at the enterprise, before it is widely implemented by service providers.

Number type plugin—The type of the number (mobile, landline, VoIP, PBX, etc.) will be determined. This information will be validated against other data obtained in real time. This information is used for other queries.

Inbound only DNO plugin—Eventually, the service providers will maintain a list of numbers that never originate calls, such as the IRS main number (1-800-TAX-1040). When this data is available, it will be integrated into CAS to detect obviously spoofed numbers.

Global blacklist plugin—Global blacklists are used to detect source numbers that should never be trusted or authenticated. The applicant maintains such a list and there are numerous third parties that can be queried to determine whether a number is on a blacklist, because for example it has been used in recent robocall campaigns.

Call patterns plugin—There are many call patterns that can be monitored for. Call patterns are not normally useful for authentication directly, but can be used to optimize the process. Some of the call patterns include:

Has a number and customer never opted out of the IVR and therefore, a pre-call authentication would be wasted?

If a number has been intermittently authenticating and not authenticating with a costly external query.

Has a number recently appeared to be part of an attack attempting to gather info from the IVR?

Service provider headers plugin—Some of the service providers are starting to pass additional information in the SIP INVITEs. Information includes values that indicate the type of call (often called OLI or ANI II), where the call originated into the terminating service providers network, and other values. Some example uses of this data are:

The OLI or ANI II does not match the type of calling device.

The origination of the device appears invalid for the calling device type.

The origination of the device has changed from past data (especially useful for landline or PBX calls).

Other suspicious call plugin—This will detect when a calling number is a prepaid/burner mobile phone. These phones are legitimate, but may require a greater level of evaluation. Another example is determining whether a number has recently been ported. Fraudsters occasionally use social-engineering techniques to steal a number from a legitimate user. This can be detected on a periodic basis by comparing daily dumps of the list of allocated numbers, which indicate the owning service provider. There are also other data sources. Another example is anonymous numbers coming from a service such as "Burner", which provides dynamic and anonymous numbers to users.

Side-channel Traffic Analysis—Side-channel analysis of call-related low-level network data and meta-information, i.e. SIP, SDP, RTP, etc., enables the disclosed system to develop deeper insight about the current incoming call and the associated caller, which are often difficult to spoof or fake. Conventional call analysis takes the meta-information that describes itself as the primary source of information. For example, a traditional analysis of SIP meta information could exploit the unexpected mismatch between the FROM, VIA, CONTACT, RECORD-ROUTE, etc., application layer header fields in a given SIP session, inferring additional information about the incoming call for which a goodness score is to be drawn. In contrast to these more conventional techniques, which are indeed still quite useful, by exploiting deeper analysis on timing, low level network packet structure, header information, proactive network level probing techniques, etc., the disclosed system is able to derive practically useful higher level of confidence around the current incoming call's origination and authenticity. The outcome of these side-channel analysis techniques, albeit probabilistic, demonstrates statistical significance around the incoming call and caller's authenticity, and by integrating this information with other techniques in CAS's decision engine (comprised of various decision plugins), the disclosed system is able to effectively separate spoofed calls from authentic calls with fairly higher level of confidence.

A second level of plugins supporting a best value result include a Service Provider API plugin. The major service providers are beginning to offer APIs and other capabilities that verify the call and calling number. In the near term, these APIs are expected to be very useful in accurately determining whether or not a call is legitimate. These APIs generally work for mobile calls and check to see if a requested call is active on their mobile network. If so, it is legitimate; if not, it is spoofed. These APIs may be treated as middle or strong. These APIs can only be used for calls from the participating service providers' mobile calls, so this must be determined before the API is used.

Audio pings plugin—To enable some $3^{rd}$ party authentication techniques, such as TRUSTID, the call must be held in a pre-answer state. Because these techniques may require some period of time to operate correctly, having the consumer hear "dead-air" is undesirable, as some percentage would hang up. Therefore customers have taken to playing some sort of audio to the consumer. A common example is 1 or 2 "fake ring tones," which are actually played as early media, rather than the network playing this audio. This means that some system at the customer premise is playing this audio. By modifying this audio in a way that creates measurable pings back, through the consumer's speaker and microphone, it will be possible for example to differentiate a mobile phone from a landline phone or approximate network distance through timing measurement. It may also be possible to tell one type of device from another. This will be very useful in determining if a number is spoofed and does not match the device type indicated by the calling number.

There is a third level of plugins supporting a best result. One such plugin is a Mobile Authentication plugin. There are third-party vendors that offer APIs that provide different levels, including strong authentication. This includes vendors such as TRUSTID. By placing a simple application or "app" on participating users' mobile phones, calls from these devices can be strongly authenticated end-to-end between the calling device and the called party. The app-based end-to-end authentication approach presents a rather motivating contrast as compared to the STIR/SHAKEN based approach, where the authentication decisions are made and verified by the originating telephony service provider and the terminating service provider respectively.

Authentication Orchestration

The key to providing authentication is orchestration between the customer-premise component and CAS. Certain actions must take place on the customer premises. A simple configurable policy system on the premises is necessary to optimally use CAS. This could be implemented in a variety of systems, but one proposed solution is based on a standard premise component deployed on the customer premises. The disclosed system will provide the following capabilities:

Define the business rules for using authentication. This can be done, for example, by defining a policy based upon the destination number of a call. Most lines of business have a set of destination 1-800 numbers, so calls to different destination numbers will get different treatment.

Implement use of various levels of authentication. For example, some business units may want just a cheapest score/risk score and/or where paying a third party for authentication is not desirable. Another business unit may want to use best value, while another best result.

Customers may want different treatment of calls based upon whether the source number is on a customer list. This data will normally not be pushed to the cloud, because it is large or too sensitive. This list may be accessed as a list that is periodically updated and/or via an API that the customer provides.

The premise component can query CAS more than once during a call and do so at different stages of the call. For example, it can be queried before the call is actually connected, which is necessary to enable some services. This also allows the result of the query to be used for call control actions, such as termination and rerouting, using the ENUM server described for the premise component.

The premise component can also defer the query to CAS until after the call is answered. This may be necessary for other queries.

The premise component can also monitor the status of the call and determine a key transition, such as when the customer "opts out" of an IVR. For many customers, authentication is not required until they leave the IVR and potentially do something that could be fraudulent. Performing authentication too early, especially when it costs money, is inefficient and can result in a large number of queries being thrown away. A typical IVR containment rate is 80%.

Although the present disclosure has been described in terms of the foregoing disclosed embodiments, this description has been provided by way of explanation only, and is not intended to be construed as a limitation of the invention. Even though the foregoing descriptions refer to embodiments that are presently contemplated, those of ordinary skill in the art will recognize many possible alternatives that have not been expressly referenced or even suggested here. While the foregoing written descriptions should enable one of ordinary skill in the pertinent arts to make and use what are presently considered the best modes of the invention, those of ordinary skill will also understand and appreciate the existence of numerous variations, combinations, and equivalents of the various aspects of the specific embodiments, methods, and examples referenced herein.

Hence the drawing and detailed descriptions herein should be considered illustrative, not exhaustive. They do not limit the invention to the particular forms and examples disclosed. To the contrary, the invention includes many further modifications, changes, rearrangements, substitutions, alternatives, design choices, and embodiments apparent to those of ordinary skill in the art, without departing from the spirit and scope of this invention, as defined by any claims included herewith or later added or amended in an application claiming priority to this present filing.

Accordingly, in all respects, it should be understood that the drawings and detailed descriptions herein are to be regarded in an illustrative rather than a restrictive manner and are not intended to limit the invention to the particular forms and examples disclosed. Rather, the invention includes all embodiments and methods within the spirit and scope of the invention as claimed, as the claims may be amended, replaced or otherwise modified during the course of related prosecution. Any current, amended, or added claims should be interpreted to embrace all further modifications, changes, rearrangements, substitutions, alternatives, design choices, and embodiments that may be evident to those of skill in the art, whether now known or later discovered. In any case, all substantially equivalent systems, articles, and methods should be considered within the scope of the invention and, absent express indication otherwise, all structural or functional equivalents are anticipated to remain within the spirit and scope of the presently disclosed systems and methods. The invention covers all embodiments within the spirit and scope of such claims, irrespective of whether such embodiments have been remotely referenced here or whether all features of such embodiments are known at the time of this filing.

We claim:

1. A method for authenticating calls, the method comprising the steps of:
   a) providing a premise component, the premise component comprising:
      1) a Session Initiation Protocol (SIP)/Real-Time Protocol (RTP) probe; and
      2) a mediation server;
   b) providing a Call Authentication Service (CAS), the CAS comprising:
      1) a Representational State Transfer (REST) Application Programming Interface (API);
      2) a plurality of Quality Authentication Service (QAS) parameters; and
      3) a decision engine comprising a plurality of authentication plug-ins;
   c) receiving, at the premise component, a call from a calling device;
   d) transmitting, by the premise component, information about the call to the CAS over the REST API;
   e) submitting, by the premise component, at least one query to the CAS;
   f) determining, by the decision engine, and based at least in part on one or more of the plurality of QAS parameters, which of the plurality of authentication plugins are necessary for making an authentication determination;
   g) generating, by the CAS, an authentication result;
   h) transmitting, by the CAS, the authentication result to the premise component; and
   i) transmitting, by the premise component, the authentication result to an Interactive Voice Response (IVR) system or an agent.

2. The method of claim 1, wherein the premise component further comprises an E.164 Number to Uniform Resource Identifier Mapping (ENUM) server.

3. The method of claim 2, wherein the ENUM server is configured to utilize the authentication result for call control actions, wherein the call control actions include rerouting the call and termination of the call.

4. The method of claim 1, wherein the authentication result is in at least one class, wherein the at least one class includes a cheapest result, a fastest result, a best value result, and a best result.

5. The method of claim 1, wherein the at least one query is submitted to the CAS before the call is connected.

6. The method of claim 1, wherein the at least one query is submitted while the call is connected.

7. A system for authenticating calls, the system comprising:
   a) a premise component configured to receive a call from a calling device, the premise component comprising:
      1) a Session Initiation Protocol (SIP)/Real-Time Protocol (RTP) probe; and
      2) a mediation server; and
   b) a Call Authentication Service (CAS), the CAS comprising:
      1) a Representational State Transfer (REST) Application Programming Interface (API);
      2) a plurality of Quality Authentication Service (QAS) parameters; and
      3) a decision engine comprising a plurality of authentication plugins;
   c) the premise component being further configured to:
      1) transmit information about the call to the CAS over the REST API; and
      2) submit at least one query to the CAS;
   d) the CAS being configured to:
      1) receive information about the call from the premise component;
      2) determine, via the decision engine, which of the plurality of authentication plugins are necessary for making an authentication decision, the determination being based at least in part on one or more of the plurality of QAS parameters;
      3) generate the authentication decision; and
      4) transmit the authentication decision to the premise component; and
   e) the premise component being further configured to transmit the authentication decision to an Interactive Voice Response (IVR) system or an agent.

8. The system of claim 7, wherein the premise component further comprises an ENUM server.

9. The system of claim 8, wherein the ENUM server is configured to utilize the authentication decision for call control actions, wherein the call control actions include rerouting the call and termination of the call.

10. The system of claim 7, wherein the authentication decision is in at least one class, wherein the at least one class includes a cheapest result, a fast result, a best value result, and a best result.

11. The system of claim 7, wherein the at least one query is submitted to the CAS before the call is connected.

12. The system of claim 7, wherein the at least one query is submitted to the CAS while the call is connected.

* * * * *